United States Patent [19]

Dixon

[11] 4,200,180
[45] Apr. 29, 1980

[54] MECHANISM FOR FEEDING WORKPIECES

[75] Inventor: Paul H. Dixon, Belvidere, Ill.

[73] Assignee: Dixon Automatic Tool, Inc., Rockford, Ill.

[21] Appl. No.: 923,096

[22] Filed: Jul. 10, 1978

[51] Int. Cl.² ............................................. B65G 25/02
[52] U.S. Cl. .......................................... 198/487; 74/88; 198/740; 221/262; 221/270
[58] Field of Search ....................... 221/243, 262, 270; 198/487, 740; 414/18, 570; 74/25, 88, 126; 226/67, 68, 163, 162, 158

[56] References Cited

U.S. PATENT DOCUMENTS

| 2,911,081 | 11/1959 | Dixon | 193/40 |
| 3,057,514 | 10/1962 | Dixon | 221/179 |
| 3,114,477 | 12/1963 | Dixon | 221/238 |
| 3,675,302 | 7/1972 | Dixon | 29/211 |
| 3,733,006 | 5/1973 | Klancnik | 221/270 X |

Primary Examiner—F. J. Bartuska
Attorney, Agent, or Firm—Leydig, Voit, Osann, Mayer & Holt, Ltd.

[57] ABSTRACT

A transfer finger for feeding small workpieces is pivotally mounted at the forward end of a rod which is adapted to be advanced and retracted by a reciprocating pneumatic actuator. During the initial portions of the advance and retract strokes of the actuator, one or more radially contractible collets frictionally grip the rod and prevent the rod from advancing and retracting the finger until such time as the actuator has pivoted the finger between active and inactive positions.

8 Claims, 15 Drawing Figures

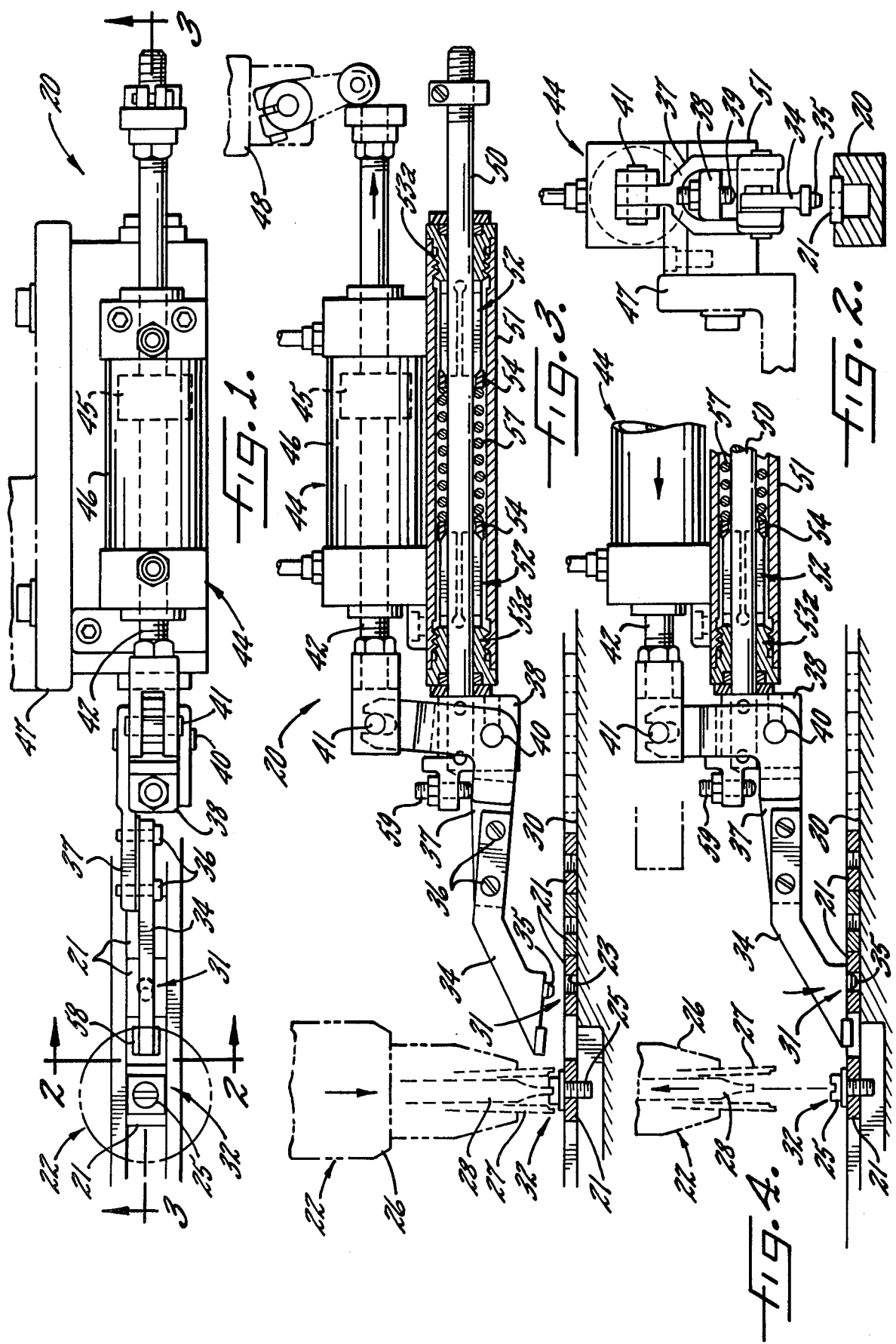

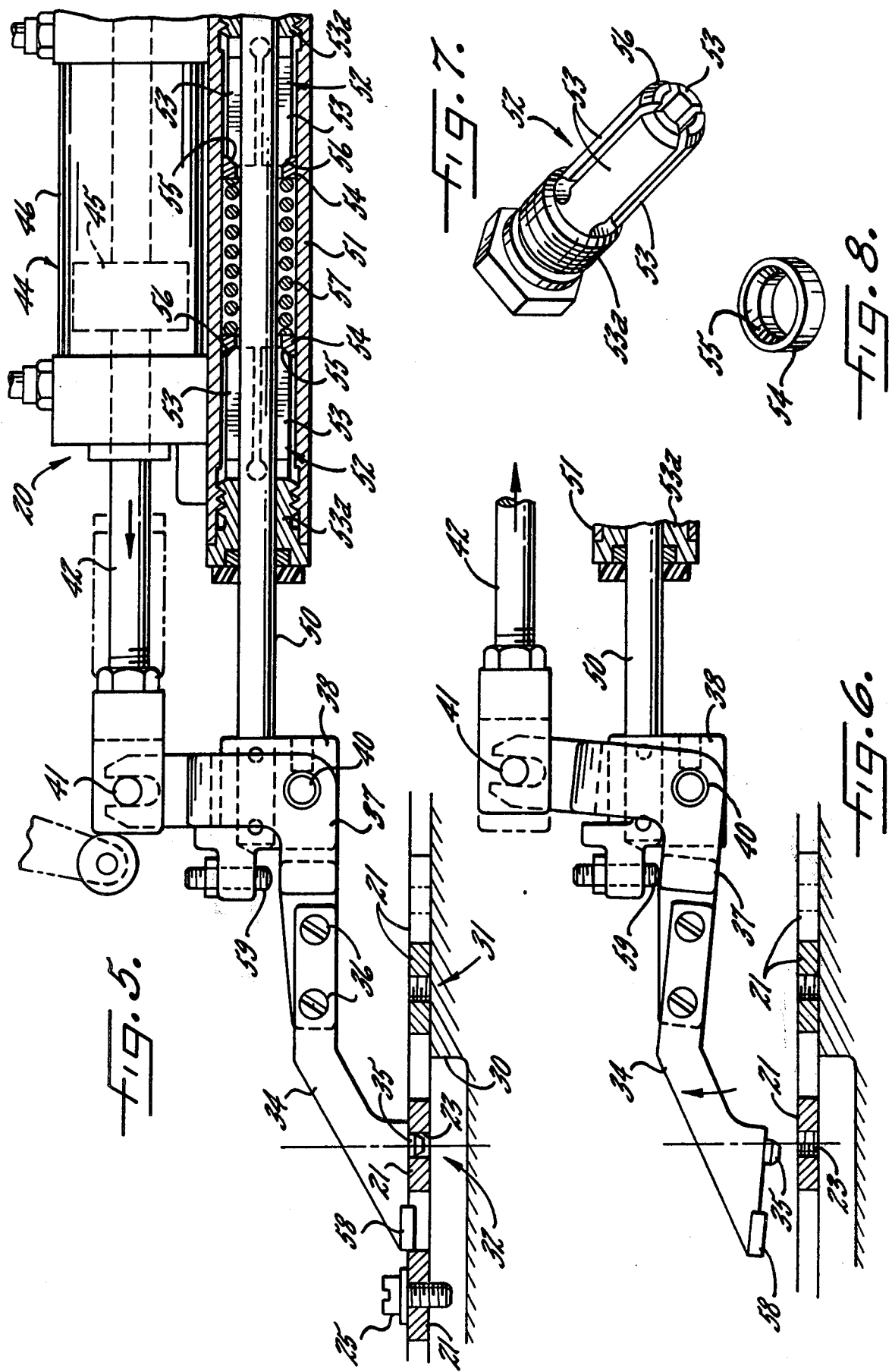

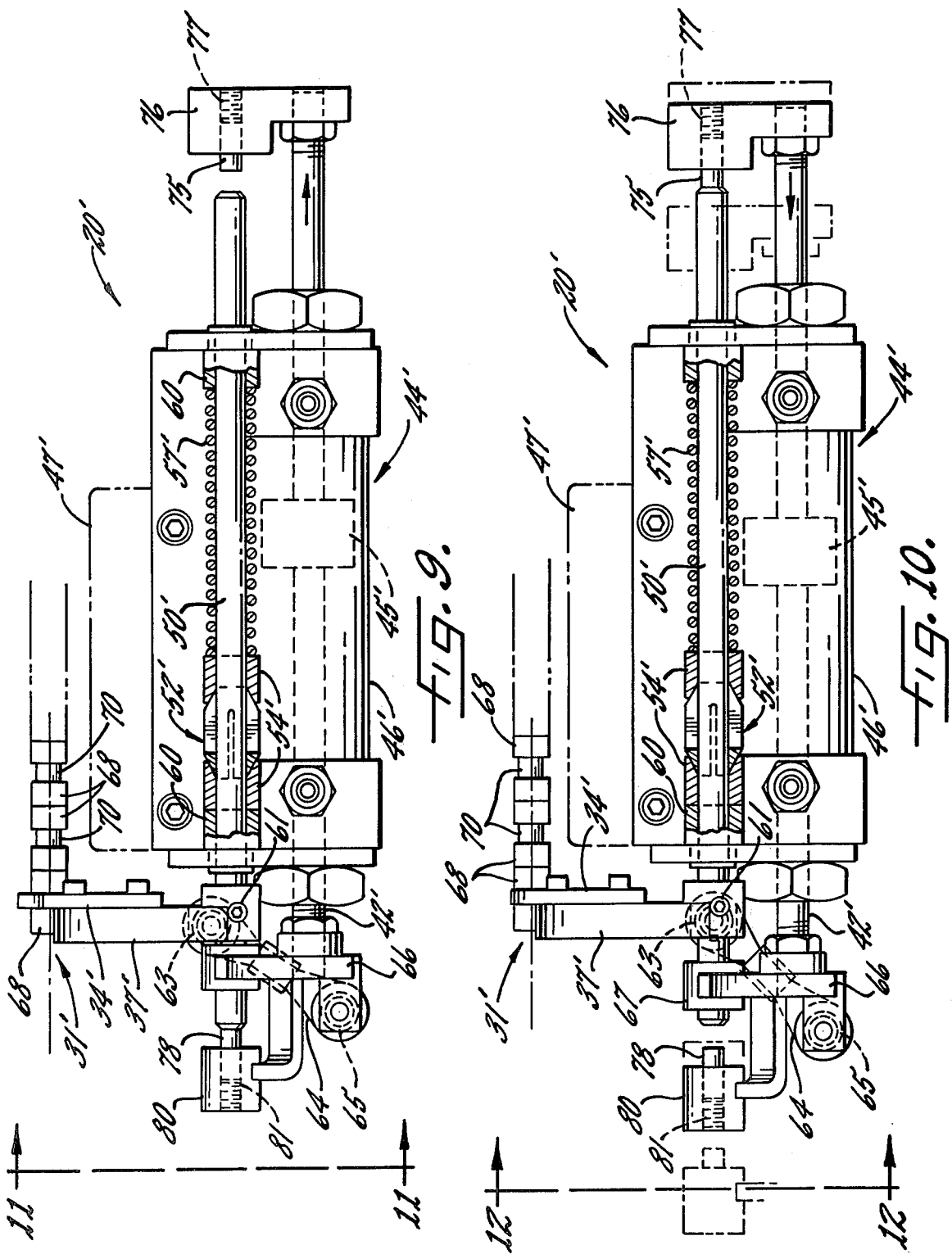

MECHANISM FOR FEEDING WORKPIECES

BACKGROUND OF THE INVENTION

This invention relates to mechanism for feeding workpieces such as screws, washers, nuts or the like to an automatic assembly machine in precisely timed relation with the operation of the machine. A mechanism of the same general type to which the present invention pertains is disclosed in Dixon U.S. Pat. No. 3,114,477. In such an arrangement, the workpieces are disposed in abutting engagement in a row in a chute or on a track and are pushed one at a time to the assembly machine by the feeding mechanism.

SUMMARY OF THE INVENTION

The general aim of the present invention is to provide a new and improved feeding mechanism which is of simplified construction, which is capable of effecting positive feeding of several different types of difficult-to-handle workpieces in a quiet manner and which remains out of engagement with the workpieces until just prior to the feed stroke.

A further object of the invention is to provide a feeding mechanism in which the member for advancing or pushing the workpiece moves with a substantially rectilinear motion in that the member ducks into controlled engagement with the terminal workpiece in the row, pushes the workpiece forwardly to the automatic assembly machine, releases the workpiece and then retracts into position to move into engagement with the next workpiece.

An important object of the invention is to provide a feeding mechanism in which the substantially rectilinear motion described above is effected in a simple manner by a single actuator.

Another object is to make novel use of a radially contractible collet to enable a single actuator to produce the rectilinear motion in a positive manner.

The invention also resides in the unique arrangement of one or more collets on a rod which carries the workpiece-handling member and in the novel mounting of the member on the rod.

These and other objects and advantages of the invention will become more apparent from the following detailed description when taken in conjunction with the accompanying drawings.

BRIEF DESCRIPTION OF THE DRAWINGS

FIG. 1 is a top plan view of one embodiment of a new and improved feeding mechanism incorporating the unique features of the present invention.

FIGS. 2 and 3 are fragmentary cross-sections taken substantially along the lines 2—2 and 3—3, respectively, of FIG. 1.

FIG. 4 is a view similar to FIG. 3 but shows parts of the feeding mechanism in moved positions.

FIGS. 5 and 6 are enlarged views similar to FIG. 3 but show parts of the feeding mechanism in different successively moved positions.

FIG. 7 is a perspective view of a collet incorporated in the feeding mechanism.

FIG. 8 is a perspective view of a ring for radially contracting the collet shown in FIG. 7.

FIG. 9 is a top plan view of another embodiment of a feeding mechanism incorporating the features of the invention.

FIG. 10 is a view similar to FIG. 9 but shows parts of the feeding mechanism in moved positions.

DETAILED DESCRIPTION OF THE PREFERRED EMBODIMENTS

Figure 11:
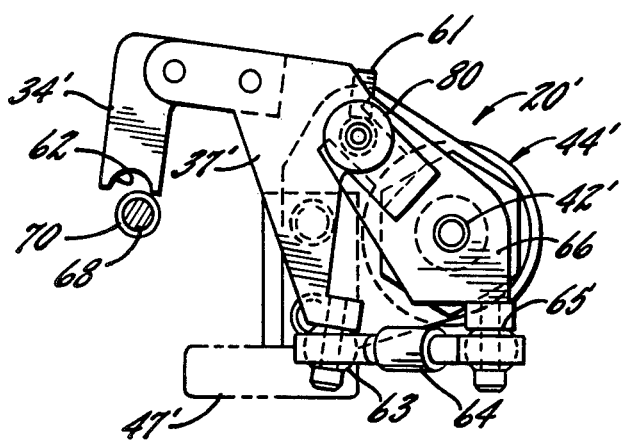
FIG. 11 is an end elevation taken along the line 11—11 of FIG. 9.
Figure 12:
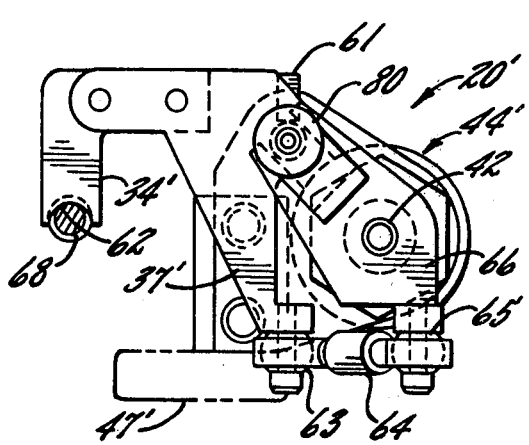
FIG. 12 is an end elevation taken along the line 12—12 of FIG. 10.

As shown in the drawings for purposes of illustration, the invention is embodied in a mechanism 20 for feeding workpieces 21 one at a time to a device such as an automatic assembly machine 22. Herein, the workpieces are shown as being flat wafers, each wafer 21 having a threaded hole 24 extending vertically therethrough and adapted to receive a screw 25.

The machine 22 automatically assembles the screws 25 with the wafers 21 at extremely high speeds and may be similar to the automatic assembly machine disclosed in Dixon U.S. Pat. No. 3,675,302. Briefly, such a machine includes a head 26 adapted to reciprocate between a raised position shown in FIG. 4 and a lowered position shown in FIG. 3. When the head is in its raised position, a screw is automatically delivered to a chuck 27 on the lower end of the head. When the head is shifted to its lowered position, a power-rotated driver bit 28 threads the screw into the hole 23 in the wafer 21.

As shown in FIG. 3, the wafers 21 are advanced from right to left in abutting, single file relation along a generally horizontal track 30 which may be vibrated in a conventional manner to effect the advance of the wafers. The terminal wafer in the row is adapted to be momentarily stopped in a loading station 31 near the forward end of the track by a releasable detent (not shown). The purpose of the feeding mechanism 20 is to transfer the wafer from the loading station to a working station 32 beneath the head 26 of the assembly machine 22 immediately after the head has been moved to its raised position.

The feeding mechanism 20 includes a transfer member in the form of a finger 34 having a downwardly projecting boss 35 on its lower end, the boss being sized to fit in the holes 23 in the wafers 21. At its rear end, the finger is secured by screws 36 to one arm of a bellcrank 37 which is pivoted on a block 38 to turn about a transversely extending horizontal axis defined by a pin 40. The other arm of the bellcrank is pivotally connected at 41 to the forward end of the plunger or rod 42 of a reversible actuator 44. In the present instance, the actuator is pneumatically operated and includes a piston 45 which is secured to the rod between the ends thereof. The rod and the piston are slidably received within a cylinder 46 which is fastened to a fixed mounting bracket 47 located above and to one side of the track 30. When pressurized air is alternately admitted into and dumped from the ends of the cylinder, the rod 42 is advanced forwardly and retracted rearwardly. A valve 48 (FIG. 3) for controlling the flow of air into and out of the cylinder is located adjacent and is adapted to be actuated by the rear end of the rod and forms part of a control system for causing the rod to advance and retract in precisely timed relation with the up and down reciprocation of the head 26 of the assembly machine 22.

According to the present invention, the feeding mechanism 20 is uniquely constructed to cause the actuator 44 to move the transfer finger 34 with a substantially rectilinear motion so as to enable the finger to maintain positive and quiet control over the wafers 21 and to enable the finger to remain out of engagement with the end wafer in the row until just prior to the feed stroke. In keeping with the invention, the actuator 44 serves (1) to pivot the transfer finger 34 downwardly into positive engagement with the wafer 21 in the loading station 31, (2) to advance the finger forwardly to shift the wafer from the loading station to the working station 32, (3) to pivot the finger upwardly from the wafer and (4) to retract the finger back to the loading station and into position to move into engagement with the next wafer. To enable the actuator 44 to achieve the foregoing, the transfer finger 34 is carried on a rod 50 which is uniquely restricted against linear movement during pivoting of the finger.

More specifically, the rod 50 is mounted for forward and rearward sliding within a sleeve 51 which is mounted on the bracket 47 beneath the cylinder 46. The block 38 is fastened securely to the forward end of the rod 50 and thus the block, the bellcrank 37 and the transfer finger 34 all move with the rod 50 when the latter is advanced and retracted.

In carrying out the invention, radially contractible collets 52 (FIGS. 5 and 8) are disposed in the ends of the sleeve 51 and frictionally grip the rod 50 to prevent the rod from advancing or retracting when a forward or rearward force is imposed on the rod during pivoting of the transfer finger 34. As shown in FIG. 7, each collet includes four angularly spaced fingers 53 which are formed integrally with and are cantilevered on a threaded end portion 53a, the latter being tubular. The two collets 52 are threaded into the two end portions of the sleeve 51 and are located such that the free ends of the fingers 53 of one collet are spaced axially from and are in facing relationship with the free ends of the fingers of the other collet. Each collet is made from a suitable bearing material such as bronze.

To contract the fingers 53 of the collets 52 radially into gripping engagement with the rod 50, rings 54 (FIGS. 5 and (8) are located in abutting relation with the free ends of the fingers. An internal taper 55 is formed in each ring and mates with an external taper 56 formed on the free ends of the respective fingers 53. Disposed between the rings 54 and telescoped over the rod 50 is a coiled compression spring 57 whose ends bear against the rings. The spring presses the rings against the fingers 53 and causes the mating tapers 55 and 56 to effect radial contraction of the fingers around the rod 50.

Just prior to the start of each cycle, the rods 42 and 50 are disposed in retracted positions as shown in FIG. 3. With the rod 42 retracted, the bellcrank 37 and the transfer fingers 34 are located angularly relative to the pivot pin 40 such that the finger is held in an inactive position (FIG. 3) with the boss 35 spaced above the wafer 21 in the loading station 31.

A cycle is initiated by operating the actuator 44 in a direction to advance the rod 42 forwardly. As the rod 42 initially advances, it exerts a force on the bellcrank 37 in a direction to pivot the finger 34 counterclockwise or downwardly. The rod 42 also acts through the pivot pin 40 and the block 38 and exerts a force on the rod 50 in a direction tending to advance the latter forwardly. Advancement of the rod 50, however, is prevented during the initial forward stroke of the rod 42 by virtue of the collets 52 frictionally gripping the rod 50. Accordingly, the initial forward stroke of the rod 42 is effective only to swing the finger 34 downwardly about the pivot pin 40 to an active position (FIG. 4) in which the boss 35 enters the hole 23 in the wafer 21 in the loading station 31.

Upon reaching its active position, the finger 34 engages and stops against the upper side of the wafer 21 in the loading station 31. With the finger thus stopped, continued advancement of the rod 42 is not effective to produce further pivoting of the bellcrank 37 and hence substantially all of the forward force of the rod 42 is transferred through the pivot pin 40 and the block 38 to the rod 50. Such force overcomes the frictional force imposed by the collets 52 and causes the rod 50 to slide in the collets and advance forwardly. As a result, the finger 34 pushes the first wafer 21 in the row forwardly from the loading station 31 to the working station 32 (see FIG. 5). As that wafer is advanced, a lug 58 on the forward end of the finger 34 pushes the preceding wafer out of the working station 32 as shown in FIG. 5.

When the wafer 21 which is engaged by the boss 35 reaches the working station 32, the actuator 44 is reversed to retract the rod 42. Initial retraction of the rod 42, however, serves only to pivot the finger 34 upwardly to an inactive position in order to pull the boss out of the hole 23 in the wafer (see FIG. 6). Even though the retracting rod 42 exerts a rearward force on the rod 50, the latter rod does not move rearwardly because of the frictional force exerted by the collets 52.

The finger 34 pivots upwardly until the bellcrank 37 engages and stops against a screw 59 which is carried by the block 38. With the bellcrank held against further pivoting, continued retraction of the rod 42 is effective to overcome the friction imposed by the collets 52 and causes the rod 50 to slide rearwardly in the collets. Accordingly, the rod 50 is retracted to shift the finger 34 rearwardly into position to move into engagement with the next wafer at the start of a succeeding cycle. The finger remains in its inactive position and out of engagement with the next wafer until the succeeding cycle is initiated. Thus, the finger does not interfere with the advance of the wafers along the track 30.

From the foregoing, it will be apparent that the present invention brings to the art a new and improved feeding mechanism 20 in which the transfer finger 34 moves with a substantially rectilinear motion. As a result, the finger is capable of ducking into pushing engagement with the wafer 21 in the loading station 31 just prior to the feed stroke. Moreover, the finger is positively lifted out of engagement with the wafer in the working station 32 prior to retraction of the finger and thus there is no danger of the finger dragging the wafer out of the working station. The collets 52 enable the various movements of the finger to be effected by the single actuator 44 and with mechanical components of simple and inexpensive construction.

A modified feeding mechanism 20' is shown in FIGS. 9 to 15 and is characterized by its ability to feed difficult-to-handle workpieces without need of first separating such workpieces out of abutting relationship with one another. The parts of the second embodiment which correspond generally with those of the first embodiment are indicated by the same but primed reference numerals.

Briefly, the feeding mechanism 20' includes an actuator 44' supported on a mounting bracket 47' and having a reciprocable plunger or rod 42'. A rod 50' extends parallel to but is offset transversely from the rod 42' and is supported to both slide and turn in bearings 60 which are secured to the mounting bracket.

A collet 52' having angularly spaced fingers 53' (FIG. 15) on both of its ends is telescoped over the rod 50', the ends of the fingers being tapered. Rings 54' with internal tapers engage the ends of the fingers. One of the rings abuts one of the bearings 60 while the other ring bears against one end of a compression spring 57' telescoped over the rod and having its opposite end disposed in engagement with the other bearing.

A bellcrank 37' is fastened securely to the forward end portion of the rod 50' by a set screw 61 and is adapted to turn about the axis of the rod 50' when the latter is turned within the bearings 60. Carried on one arm of the bellcrank is a transfer finger 34' whose lower end is formed with a downwardly opening notch 62 (FIG. 11). The other arm of the bellcrank carries a spherical bearing 63 which serves to connect that arm pivotally to one end of a link 64. The other end of the link is connected to a similar spherical bearing 65 on the lower end of a plate 66 which is fastened to the forward end of the rod 42'. A sleeve bearing 67 (FIG. 13) is supported on the upper portion of the plate and slidably and rotatably receives the forward end of the rod 50'.

The feeding mechanism 20' is adapted to advance workpieces such as cylindrical pins 68 each having a circumferentially extending groove 70 formed between its ends. Such pins are fed in abutting end-to-end relation along a vibratory track (not shown), the leading pin being stopped by a detent in a loading station corresponding to the loading station 31 of FIG. 1.

Before the start of each cycle, the rod 42' of the actuator 44' is in a retracted position as shown in FIG. 9 and holds the rod 50' in a retracted position. With the rod 50' retracted, the bellcrank 37' is located angularly in the position shown in FIG. 11 and holds the transfer finger 34' in an inactive position spaced above the pin 68 in the loading station.

As before, a cycle is initiated by operating the actuator 44' in a direction to advance the rod 42'. As the rod 42' is initially advanced, it acts through the plate 66 and the link 64 to pivot the bellcrank 37' counterclockwise about the axis of the rod 50' and thus move the transfer finger 34' to an active position shown in FIGS. 10 and 12. In moving to its active position, the finger swings in a transversely extending vertical plane and thus the lower end of the finger is capable of freely entering the groove 70 in the leading pin 68.

Initial advancement of the rod 42' also acts through the plate 66, the link 64, the bellcrank 37' and the set screw 61 to exert a forward force on the rod 50'. The collet 52', however, frictionally resists movement of the rod 50' and thus the latter is prevented from advancing during pivoting of the transfer finger 34' to its active position.

Pivoting of the transfer finger 34= is stopped when the finger engages the leading pin 68. Thereafter, the force of the advancing rod 42' is capable of acting through the plate 66, the link 64, the bellcrank 37' and the set screw 61 to overcome the collet 52' and effect advancement of the rod 50'. Undue stress on these parts is avoided, however, through the use of a pin 75 (FIGS. 9 and 10) which is carried on a block 76 fastened to the rear end of the rod 42'. Once the transfer finger 34' has reached its active position, the pin 75 engages the rear end of the rod 50' to push the latter forwardly. The position of the pin 75 may be adjusted by a set screw 77 in the block 76 and thus the pin 75 may be located to engage the rod 50' just after the transfer finger 34' reaches its active position and just before the link 64 has pivoted sufficiently far to exert a substantial forward force on the bellcrank 37'.

Figure 13:
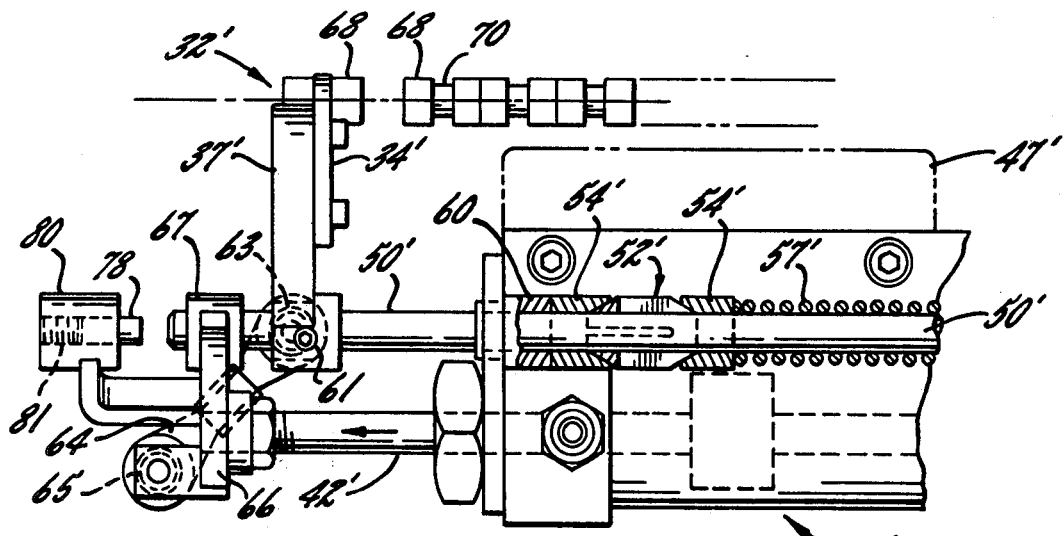
FIGS. 13 and 14 are views similar to FIG. 9 but show parts of the feeding mechanism in successively moved positions.
Figure 14:
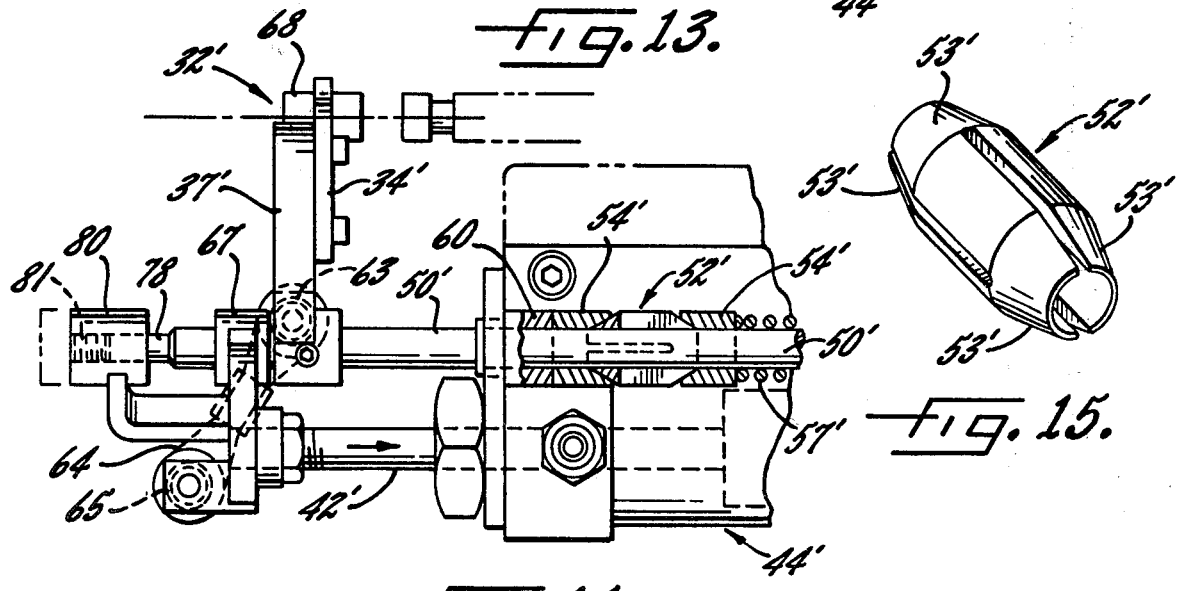
Figure 15:
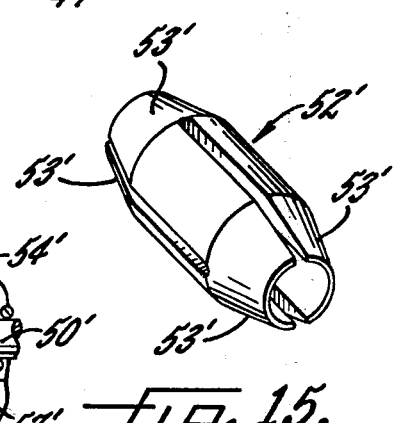
FIG. 15 is a perspective view of a collet incorporated in the feeding mechanism shown in FIGS. 9 to 14.

As the rod 50' advances, the transfer finger 34' pushes the leading pin 68 to the working station (see FIG. 13). When the pin reaches that station, the actuator 44' is reversed to retract the rod 42'. During initial retraction of the rod 42', the transfer finger 34' simply swings upwardly from its active position (FIG. 12) to its inactive position (FIG. 11) since retraction of the rod 50' is restrained by the collet 52'. Thereafter, the rod 50' is retracted to shift the transfer finger 34' rearwardly into position to pivot downwardly into engagement with the next pin 68. Retraction of the rod 50' is effected by a pin 78 (FIG. 14) which is carried on a block 80 on the forward end of the plate 66. The pin 78 is adapted to push against the forward end of the rod 50' and its position may be established by a set screw 81.

It will be apparent from the foregoing that the transfer finger 34' of the feeding mechanism 20' moves in a transversely extending vertical plane and thus is capable of shifting into pushing engagement with a workpiece such as the pin 68 without need of the pin first being separated out of abutting engagement with the adjacent pin in the row. Accordingly, the feeding mechanism 20' is capable of advancing difficult-to-handle parts which heretofore could be advanced only by using a much more complex feeding mechanism.

I CLAIM:

1. Mechanism for advancing a workpiece along a generally straight path from a first station to a second station, said mechanism comprising a member for engaging and advancing the workpiece, a rod extending generally parallel to said path and mounted for lengthwise reciprocation through advance and retract strokes, said member being mounted on said rod to move with said rod between said first and second stations when said rod is advanced and retracted and being mounted to move between active and inactive positions, said member engaging the workpiece when in said active position and releasing the workpiece when in said inactive position, a reversible actuator connected to said member, said actuator being operable when actuated in one direction to apply a force to said member in a direction tending to move said member to said active position and tending to advance said rod, said actuator being operable when actuated in the opposite direction to apply a force to said member in a direction tending to move said member to said inactive position and tending to retract said rod, and means surrounding and gripping said rod and frictionally retarding movement of said rod as said actuator moves said member between said active and inactive positions, said means permitting said rod to advance only after said actuator has moved said member to said active position and permitting said rod to retract only after said actuator has moved said member to said inactive position.

2. Mechanism as defined in claim 1 in which said means comprise a collet surrounding said rod and having a series of angularly spaced and axially extending fingers.

3. Mechanism as defined in claim 2 further including a ring disposed in engagement with the free ends of said fingers, means pressing said ring axially against said fingers, and mating tapers formed on said fingers and said ring and operable to contract said fingers radially into gripping engagement with said rod when said ring is pressed axially against said fingers.

4. Mechanism as defined in claim 1 in which said means comprise a pair of collets spaced axially along and surrounding said rod, each of said collets having a series of angularly spaced and axially extending fingers with the free ends of the fingers of one collet facing the free ends of the fingers of the other collet, and a coiled compression spring telescoped over said rod between said collets and having ends bearing against the free ends of the fingers of said collets, said spring being operable to contract said fingers radially into gripping engagement with said rod.

5. Mechanism as defined in any of claims 1 to 4 in which said member is mounted on said rod to pivot relative thereto about an axis extending transversely of said path, said actuator comprising a reciprocating plunger extending parallel to said rod and connected to said member to pivot the latter about said axis between said active and inactive positions.

6. Mechanism as defined in any of claims 1 to 3 in which said member is mounted on said rod to pivot about the longitudinal axis of the rod, said mechanism comprising a reciprocating plunger extending parallel to said rod, and a link connected pivotally between said plunger and said member and operable to pivot the latter about said axis between said active and inactive positions when said plunger is reciprocated.

7. Mechanism as defined in claim 6 in which said rod is mounted to turn about its longitudinal axis, said member being fast on said rod.

8. Mechanism as defined in claim 6 in which the ends of said plunger include means for engaging the ends of said rod and for advancing and retracting said rod after said plunger has pivoted said member between said active and inactive positions.

* * * * *